(12) United States Patent
Nakashita

(10) Patent No.: US 10,541,629 B2
(45) Date of Patent: Jan. 21, 2020

(54) VIBRATION DRIVEN ACTUATOR, APPARATUS, AND OPTICAL APPARATUS

(71) Applicant: CANON KABUSHIKI KAISHA, Tokyo (JP)

(72) Inventor: Daisuke Nakashita, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 463 days.

(21) Appl. No.: 15/223,014

(22) Filed: Jul. 29, 2016

(65) Prior Publication Data

US 2017/0038554 A1    Feb. 9, 2017

(30) Foreign Application Priority Data

Aug. 4, 2015    (JP) .................................. 2015-154217

(51) Int. Cl.
*G02B 7/02*        (2006.01)
*H02N 2/02*        (2006.01)
*G03B 17/14*       (2006.01)

(52) U.S. Cl.
CPC ............. *H02N 2/026* (2013.01); *G03B 17/14* (2013.01)

(58) Field of Classification Search
CPC .... G02B 7/04; G03B 3/10; G03B 2205/0053; G03B 17/14; H02N 2/0055; H02N 2/026
See application file for complete search history.

(56) References Cited

U.S. PATENT DOCUMENTS

| 7,732,983 B2 * | 6/2010 | Kasai | ........................ G02B 7/08 310/323.02 |
| 7,999,439 B2 | 8/2011 | Sakamoto | |

(Continued)

FOREIGN PATENT DOCUMENTS

| CN | 101946396 A | 1/2011 |
| CN | 103227585 A | 7/2013 |

(Continued)

OTHER PUBLICATIONS

Office Action issued in Japanese Appln. No. 2015-154217 dated Oct. 17, 2017.

(Continued)

*Primary Examiner* — Alicia M Harrington
(74) *Attorney, Agent, or Firm* — Rossi, Kimms & McDowell LLP

(57) ABSTRACT

A vibration driven actuator includes a vibrator, a vibrator holder, a friction member, a pressing member that enables the vibrator to compressively contact the friction member in a first direction, and a pressure transmitting member disposed between the vibrator and the pressing member. The vibrator and the friction member relative move in a second direction orthogonal to the first direction due to the vibration. A first contact portion disposed to one of the vibrator holder and the pressure transmitting member contacts a second contact portion disposed to the other of the vibrator holder and the pressure transmitting member so as to restrict a relative displacement between the vibrator holder and the pressure transmitting member in the second direction, and to allow a relative rotation between the vibrator holder and the pressure transmitting member on a plane parallel to the first direction and the second direction.

14 Claims, 4 Drawing Sheets

(56) References Cited

U.S. PATENT DOCUMENTS

| | | |
|---|---|---|
| 9,219,429 B2 | 12/2015 | Yamanaka et al. |
| 9,660,556 B2 | 5/2017 | Yamamoto |
| 9,680,399 B2 | 6/2017 | Yamanaka et al. |
| 9,812,994 B2 | 11/2017 | Yamasaki et al. |
| 2006/0061235 A1 | 3/2006 | Funakubo |
| 2009/0140608 A1 | 6/2009 | Kasai |
| 2011/0199696 A1* | 8/2011 | Lee .................. G02B 7/08 359/824 |

FOREIGN PATENT DOCUMENTS

| | | |
|---|---|---|
| CN | 103296920 A | 9/2013 |
| CN | 104065298 A | 9/2014 |
| CN | 104104265 A | 10/2014 |
| JP | H0947044 A | 2/1997 |
| JP | H09224384 A | 8/1997 |
| JP | 2006074972 A | 3/2006 |
| JP | 2006094591 A | 4/2006 |
| JP | 2009142014 A | 6/2009 |
| JP | 2014212682 A | 11/2014 |
| JP | 2015043668 A | 3/2015 |
| JP | 6305377 B2 | 4/2018 |

OTHER PUBLICATIONS

Office Action issued in Chinese Appln. No. 201610619787.9 dated May 30, 2018. English Translation provided.

Office Action issued in Japanese Appln. No. 2018-036744 dated Nov. 27, 2018. English translation provided.

\* cited by examiner

VIBRATION DRIVEN ACTUATOR, APPARATUS, AND OPTICAL APPARATUS

BACKGROUND OF THE INVENTION

Field of the Invention

The present invention relates to a vibration driven actuator used for an apparatus, such as an optical apparatus.

Description of the Related Art

A vibration driven actuator (vibration wave motor) is configured to relatively move a vibrator and a friction member that compressively contacts the vibrator, by exciting the vibration in the vibrator using an electro-mechanical energy conversion, and used to drive a lens in an optical apparatus, such as a camera and an interchangeable lens. Such a vibration driven actuator contains a linear type vibration driven actuator disclosed in Japanese Patent Laid-Open No. ("JP") 2014-212682 in addition to a ring type vibration driven actuator and a rod type vibration driven actuator.

The vibration driven actuator disclosed in JP 2014-212682 includes a pressing member configured to generate a pressing force for bringing the vibrator into compressive contact with a friction member. A pressure transmitting member (a pressing force transmitting member, a pressing plate) configured to contact the pressing member and to transmit a pressing force to the vibrator is provided between the vibrator and the pressing member. Since the pressure transmitting member is rotatably held, the vibrator that changes its orientation (rotates) due to the vibration can always be uniformly pressed against the friction member.

However, the vibration driven actuator disclosed in JP 2014-212682 may cause a shift of a contact position between the pressing member and the pressure transmitting member. Moreover, a relative position may also shift between the pressure transmitting member and the vibrator. This shift may prevent the pressing force generated by the pressing member from uniformly press the vibrator against the friction member, and may cause the characteristic of the vibration driven actuator to be unstable.

SUMMARY OF THE INVENTION

The present invention provides a vibration driven actuator that has a stable characteristic by restraining, with a simple structure, a shift of a contact position between a pressing member and a pressure transmitting member, and a shift of a relative position between a pressure transmitting member and a vibrator. The present invention also provides an optical apparatus using the vibration driven actuator.

A vibration driven actuator according to one aspect of the present invention includes a vibrator in which a vibration is excited by an electro-mechanical energy conversion, a vibrator holder configured to hold the vibrator, a friction member configured to contact the vibrator, a pressing member configured to generate a pressing force so as to enable the vibrator to compressively contact the friction member in a first direction, and a pressure transmitting member disposed between the vibrator and the pressing member, and configured to transmit the pressing force to the vibrator. The vibrator and the friction member relative move in a second direction orthogonal to the first direction due to the vibration. A first contact portion disposed to one of the vibrator holder and the pressure transmitting member contacts a second contact portion disposed to the other of the vibrator holder and the pressure transmitting member so as to restrict a relative displacement between the vibrator holder and the pressure transmitting member in the second direction, and to allow a relative rotation between the vibrator holder and the pressure transmitting member on a plane parallel to the first direction and the second direction.

Further features of the present invention will become apparent from the following description of exemplary embodiments with reference to the attached drawings.

DESCRIPTION OF THE EMBODIMENTS

A description will now be given of embodiments according to the present invention, with reference to the accompanying drawings.

First Embodiment

Figure 1:
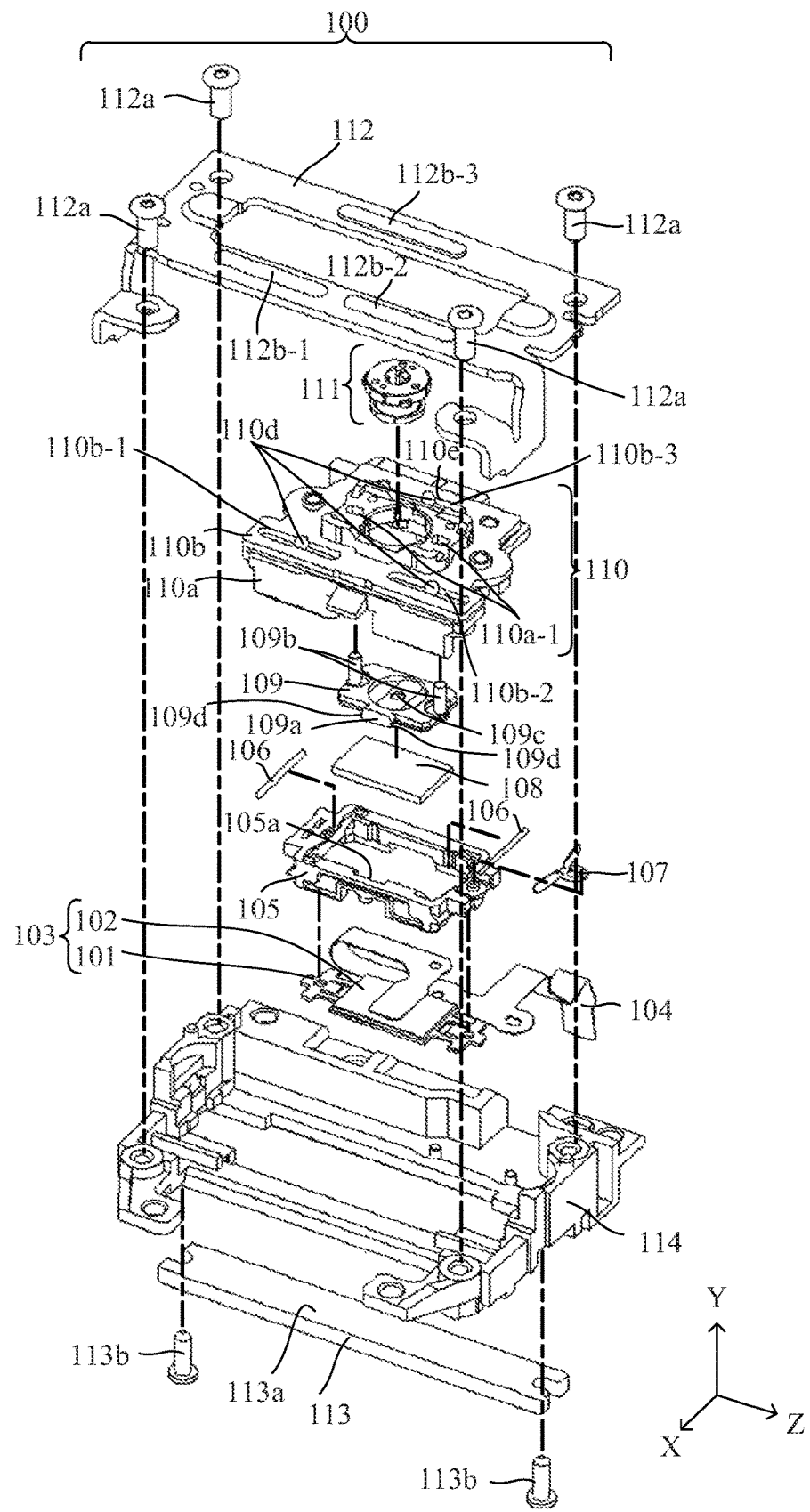
FIG. 1 is an exploded perspective view of a vibration driven actuator according to a first embodiment of the present invention.
Figure 2:
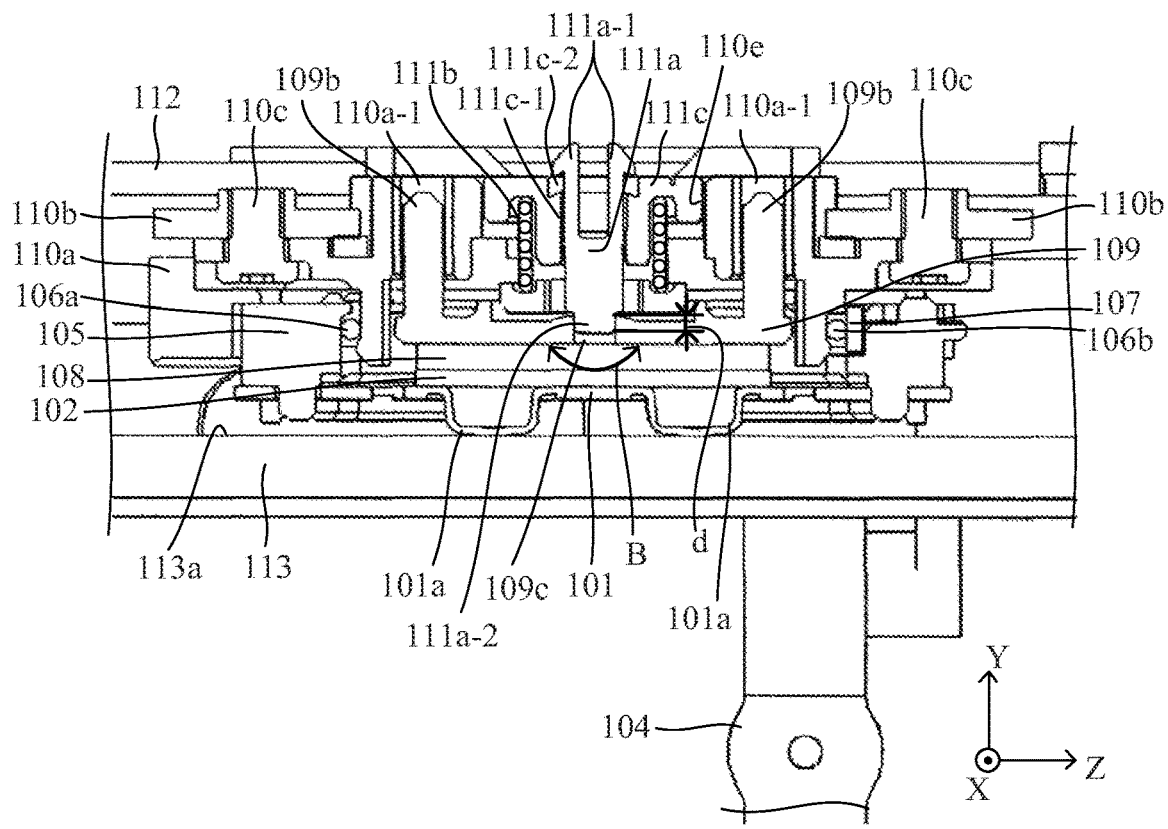
FIG. 2 is a sectional view of the vibration driven actuator according to the first embodiment.

FIG. 1 illustrates an exploded vibration driven actuator 100 according to a first embodiment of the present invention. In FIG. 1, a Y direction denotes a pressing direction (first direction) in which a vibrator, which will be described later, is forced or pressed against a friction member in a vibration driven actuator 100, and a Z direction denotes a relative moving direction (second direction) between the vibrator and the friction member. An X direction denotes a width direction (third direction) orthogonal to the Y direction and the Z direction. FIG. 2 illustrates the assembled vibrator driven actuator 100 according to this embodiment on a YZ section that is parallel to the Y direction and the Z direction.

Reference numeral 101 denotes a vibrator plate as a metal elastic member. Reference numeral 102 denotes a piezoelectric element as an electro-mechanical energy converter. The vibrator plate 101 and the piezoelectric element 102 are bonded together, and form a vibrator 103.

Reference numeral 104 denotes a wiring substrate, which is electrically connected to the piezoelectric element 102. The vibrator plate 101 has two protrusion portions 101a that are arranged in the Z direction. Tips (bottom ends) of the two protrusion portions 101a contact a frictional contact surface 113a of the friction member 113, which will be described later.

Reference numeral 105 denotes a vibrator holder, configured to hold the whole vibrator 103 by holding both ends of the vibrator plate 101. Reference numeral 106 denotes a rolling member, and reference numeral 107 denotes a spring member for the rolling member 106. The rolling members 106 and the spring member 107 are attached to the vibrator holder 105. A moving base member 110, which will be described later, holds the vibrator holder 105 via the rolling members 106 and the rolling spring member 107 so that the vibrator holder 105 can displace in the Y direction and the vibrator holder 105 can be prevented from displacing in the Z direction.

In this embodiment, the prevention of the displacement means a complete prohibition of any displacements, or a prohibition of a displacement exceeding a permissible range and an allowance of a displacement within the permissible range.

Reference numeral 109 denotes a pressure transmitting member. Reference numeral 108 denotes a buffer member made of an elastic material, and arranged between the piezoelectric element 102 and the pressure transmitting member 109. The buffer member 108 restrains the vibration of the vibrator 103 from transmitting to the pressure transmitting member 109 and other members above the pressure transmitting member 109.

The pressure transmitting member 109 includes a protrusion portion 109a as a first contact portion at one end of the pressure transmitting member 109 in the width direction (X direction), and the protrusion portion 109a restricts a displacement of the pressure transmitting member 109 relative to the vibrator holder 105 in the Z direction (or a relative displacement between the pressure transmitting member 109 and the vibrator holder 105). The pressure transmitting member 109 has two shaft members 109b as third contact portions at two locations in the Z direction, and the shaft members 109b restrict a displacement of the pressure transmitting member 109 relative to the moving base member 110 in the X direction (or a relative displacement between the pressure transmitting member 109 and the vibrator holder 105).

A fitting hole portion 109c, in which a fitting shaft of the pressure member 111, which will be described later, is fit is provided at the center of the pressure transmitting member 109 or at the center between the two shaft members 109b in the Z direction and at the center in the X direction. Since the fitting hole portion 109c is arranged at the center of the pressure transmitting member 109, the pressing force from the pressing member 111 can be uniformly transmitted to the two protrusion portions 101a.

The moving base member 110 includes a holder 110a configured to hold the vibrator 103, the vibrator holder 105, and the pressure transmitting member 109, and a top surface portion 110b. The top surface portion 110b has three guide groove portions 110b-1, 110b-2, and 110-3 configured to extend in the Z direction at both sides of the top surface portion 110b in the width direction (X direction). Each of the three guide groove portions 110b-1, 110b-2, and 110-3 is engaged with a ball 110d. The moving base member 110, the vibrator 103, the vibrator holder 105, the pressure transmitting member 109, and the pressing member 111 which are held by the moving base member 110 constitute a moving unit.

The pressing member 111 generates the pressing force for bringing the vibrator 103 into compressive contact with the friction member 113 in the Y direction. The pressing member 111 includes a pressing axis member 111a, a compression spring 111b, and a fixed axis member 111c.

Reference numeral 112 denotes a cover plate, which is fixed by four screws 112a onto a housing member 114, which will be described later. The cover plate 112 includes guide groove portions 112b-1, 112b-2, and 112b-3 configured to extend in the Z direction at locations corresponding to the three guide groove portions 110b-1, 110b-2, and 110b-3 in the moving base member 110. The balls 110d are held between the guide groove portions 110b-1, 110b-2, and 110b-3 in the moving base member 110 and the guide groove portions 112b-1, 112b-2, and 112b-3 in the cover plate 112 so that the balls 110d can roll in the Z direction.

The friction member 113 has the frictional contact surface 113a that contacts the two protrusion portions 101a of the vibrator plate 101. The friction member 113 is fixed onto the housing member 114 via two screws 113b at both ends of the friction member 113 in the Z direction.

The housing member 114 holds the cover plate 112 and the friction member 113, and holds the moving base member 110 of the moving unit while guiding the moving base member 110 in the Z direction.

Figure 3:
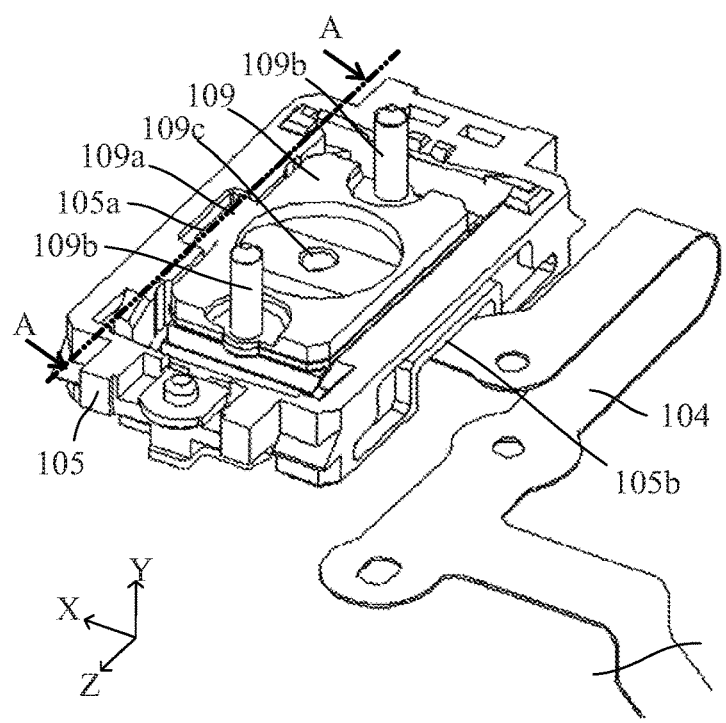
FIG. 3 is a partial enlarged perspective view of the vibration driven actuator according to the first embodiment.
Figure 4:
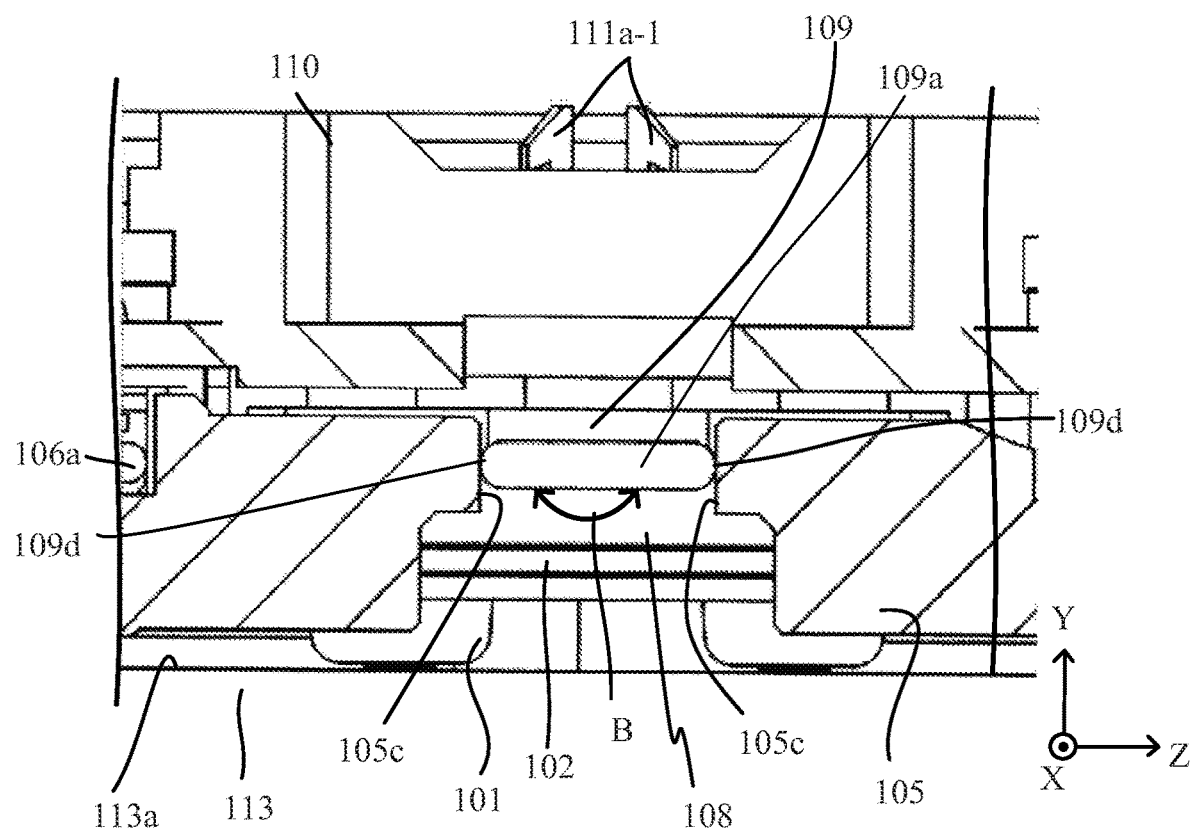
FIG. 4 is a partial sectional view of the vibration driven actuator according to the first embodiment.

Referring now to FIGS. 2, 3, and 4, a description will be given of pressing the vibrator 103 by the pressing member 111 and rotating the pressure transmitting member 109. FIG. 3 illustrates the pressure transmitting member 109 assembled into the vibrator holder 105, and FIG. 4 illustrates the pressure transmitting member 109 and the vibrator holder 105 on a section taken along an A-A line in FIG. 3. In FIG. 3, the vibrator holder 105 holds the vibrator 103 connected to the wiring substrate 104.

In FIG. 2, the pressing member 111 includes, as described above, the pressing axis member 111a, the compression spring 111b, and the fixed axis member 111c. The fixed axis member 111c is inserted into a fixed axis holding hole portion 110e formed in the moving base member 110, and bayonet-coupled with the fixed axis holding hole portion 110e when the fixed axis member 111c is rotated around an axis that extends in the Y direction. As a consequence, the fixed axis member 111c is fixed into the moving base member 110. This configuration prevents the fixed axis member 111c from displacing (falling off) in the +Y direction (up direction on the opposite side of the vibrator 103) relative to the moving base member 110.

In addition, the pressing axis member 111a is inserted into the hole portion 111c-1 formed at the center of the fixed axis member 111c from the bottom so that the pressing axis member 111a can be elastically deformed and an interval between two claw portions 111a-1 formed at the top of the pressing axis member 111a can be narrowed. The two claw portions 111a-1 inserted into the hole portion 111c-1 return to the pre-deformed state and the interval between them increases. The pressing axis member 111a is held by the fixed axis member 111c so that the pressing axis member 111a can move in the Y direction in a range that has a bottom end position at which the claw portions 111a-1 are engaged with claw locking portions 111c-2 formed at the upper part of the hole portion 111c-1 in the fixed axis member 111c.

The compression spring 111b is held in the compressed state by the pressing axis member 111a and the fixed axis member 111c. This configuration generates a pressing force in the pressing axis member 111a in the -Y direction (down direction towards the vibrator 103). In addition, the fitting shaft 111a-2 formed on the tip (bottom end) of the pressing axis member 111a is inserted into and fits in the fitting hole portion 109c formed in the pressure transmitting member 109. Therefore, the pressing axis member 111a is held by two locations in the Y direction, i.e., the hole portion 111c-1 in the fixed axis member 111c and the fitting hole portion 109c in the pressure transmitting member 109, and can provide stable pressing in the Y direction.

Each of the two shaft members 109b of the pressure transmitting member 109 is inserted into a corresponding one of two elongate hole portions 110a-1 as fourth contact portions formed in the holder 110a of the moving base member 110. Each elongate hole portion 110a-1 is longer in the Z direction, and is engaged with (contacts) the shaft member 109b so as to restrict a displacement of the shaft member 109b in the X direction and to allow a displacement of the shaft member 109b in the Z direction. This configuration allows the displacement of the pressure transmitting member 109 relative to the moving base member 110 in the Y direction and the rotation of the pressure transmitting member 109 relative to the moving base member 110 on the YZ plane (relative rotation between the pressure transmitting member 109 and the moving base member 110), and restricts the displacement of the pressure transmitting member 109 relative to the moving base member 110 in the X direction.

Moreover, the protrusion portion 109a of the pressure transmitting member 109 is engaged with (contacts) a concave 105a in the Z direction, as a second contact portion formed on one sidewall of the vibrator holder 105 in the width direction (X direction). This configuration restricts the displacement of the pressure transmitting member 109 relative to the vibrator holder 105 in the Z direction. Moreover, this engagement allows a displacement of the pressure transmitting member 109 relative to the vibrator holder 105 in the Y direction (relative displacement between the pressure transmitting member 109 and the vibrator holder 105) and a rotation of the pressure transmitting member 109 relative to the vibrator holder 105 on the YZ section (a relative rotation between the pressure transmitting member 109 and the vibrator holder 105).

Since the moving base member 110 holds the vibrator holder 105 while restricting the displacement of the vibrator holder 105 in the Z direction via the rolling members 106 and the rolling spring member 107, the displacement of the pressure transmitting member 109 relative to the moving base member 110 in the Z direction is also restricted.

The wiring substrate 104 is led out through a wire leading portion 105b configured as a concave in the vibrator holder 105. The wire leading portion 105b is provided at an opposite side of the concave 105a in the X direction. Since the concave 105a and the wire leading portion 105b are provided at separate locations in the vibrator holder 105, the strength of the vibrator holder 105 can be maintained.

The fitting hole portion 109c is provided at the center of the pressure transmitting member 109 in the Z and X directions. The vibrator 103 is held by the vibrator holder 105 via the buffer member 108 on the back surface side of the pressure transmitting member 109. Since the fitting shaft 111a-2 of the pressing axis member 111a in the pressing member 111 is inserted into the fitting hole portion 109c in the pressure transmitting member 109, the pressing force is generated at this position. As a result, the pressing force from the pressing member 111 is always applied to the center of the vibrator 103 in the Z and X directions. Thereby, as illustrated in FIG. 2, a uniform pressing force can be applied to the two protrusion portions 101a of the vibrator plate 101, and the protrusion portions 101a can stably and compressively contact the frictional contact surface 113a of the friction member 113.

As illustrated in FIG. 4, the concave 105a in the vibrator holder 105 has planes 105c as contact surfaces at both sides in the Z direction. The protrusion portion 109a of the pressure transmitting member 109 has an arc-curved surfaces 109d as contact surfaces at both sides in the Z direction. Each arc-curved surface 109d linearly contacts (line-contacts) the plane 105c in the X direction.

Due to this configuration, the pressure transmitting member 109 is held relative to the vibrator holder 105 so as to restrict displacements of the pressure transmitting member 109 in the Z and X directions, and to provide the pressure transmitting member 109 with a degree of freedom to some extent in the Y direction and on the YZ section. The fitting shaft portion 111a-2 of the pressing axis member 111a fits in the fitting hole portion 109c in the pressure transmitting member 109 with a slight aperture. The fitting length of the fitting shaft 111a-2 in the fitting hole portion 109c is set to be short as illustrated by a size d in FIG. 2. Hence, the pressure transmitting member 109 is rotatable relative to the pressing member 111 around the fitting hole portion 109c on the YZ section in a direction illustrated by an arrow B in FIG. 2. The vibrator holder 105 is held by the moving base member 110 via the rolling member 106 and the spring member 107, and thus rotatable relative to the moving base member 110 in the direction illustrated by the arrow B in addition to the displacement in the Y direction.

Thus, even when there is a relative inclination between the cover plate 112 and the friction member 113 due to a manufacturing error, etc., a good frictional contact state of the vibrator 103 on the frictional contact surface 113a of the friction member 113 can be maintained. Even when the flatness of the frictional contact surface 113a of the friction member 113 is not so high, a good frictional contact state can be similarly maintained. For example, in FIG. 2, when the friction member 113 inclines diagonally right up relative to the cover plate 112, the vibrator 103 and the vibrator holder 105 together rotate counterclockwise and become diagonally right up. The buffer member 108 and the pressure transmitting member 109 rotate counterclockwise. Thereby, the two protrusion portions 101a of the vibrator plate 101 compressively contact the frictional contact surface 113a of the friction member 113 due to uniform pressing forces, and a stable frictional contact state can be realized.

A displacement of the pressure transmitting member 109 in the Z direction is restricted by the engagement between the protrusion portion 109a and the concave 105a of the vibrator holder 105, and a displacement of the pressure transmitting member 109 in the X direction is also restricted by the engagements between the two shaft members 109b and the elongate hole portions 110a-1 in the moving base member 110. In this state, the fitting shaft 111a-2 of the pressing axis member 111a configured to transmit the pressing force fits in the fitting hole portion 109c in the pressure transmitting member 109 while a rotation of the pressure transmitting member 109 on the YZ section is allowed. Therefore, the contact position between the pressure transmitting member 109 and the pressing axis member 111a does not shift even when the pressure transmitting member 109 rotates. This configuration can always transmit the pressing force to the center of the pressure transmitting member 109 and enable the pressing forces transmitted to the two protrusion portions 101a of the vibrator plate 101 to be uniform.

Since the protrusion portion 109a of the pressure transmitting member 109 linearly contacts the concave 105a in the vibrator holder 105 in the X direction, the pressure transmitting member 109 is rotatable in the arrow B direction illustrated in FIG. 2 relative to the vibrator holder 105 on the YZ section. Since the buffer member 108 is disposed between the vibrator holder 105 and the pressure transmitting member 109, the vibrator holder 105 and the pressure transmitting member 109 do not rotate together due to the buffering action of the buffer member 108. Displacement amounts of the vibrator holder 105 in the Y direction and on the YZ section relative to the moving base member 110 are larger than a displacement amount of the pressure transmitting member 109 because the vibrator 103 is directly attached to the vibrator holder 105. The buffering characteristic of the buffer member 108 slightly varies due to environmental changes, such as a variation over time and the humidity. For example, in the highly humid environment, the buffer member 108 contains moistures and changes its buffering characteristic.

Despite the above factors, the above line contact realizes a stable compressive contact of the two protrusion portions 101a of the vibrator plate 101 against the friction member 113 even when the vibrator holder 105 and the pressure transmitting member 109 do not rotate integrally. In addition, the above line contact can maintain a stable compressive contact even when the characteristic of the buffer member 108 varies due to the variation over time and the environmental change.

The aforementioned configuration can realize a small vibration driven actuator 100 having a simple structure that enables the vibrator 103 to stably and compressively contact the friction member 113. In other words, the simple structure in which the protrusion portion 109a of the pressure transmitting member 109 contacts or is engages with the concave 105a in the vibrator holder 105 can restrain a contact position shift between the pressing member 111 and the pressure transmitting member 109 and a relative position shift between the pressure transmitting member 109 and the vibrator 103. Hence, this embodiment can provide a small vibration driven actuator 100 having a stable characteristic.

The vibration (elliptical motion) can be generated at the tips of the protrusion portions 101a by applying a driving signal to the piezoelectric element 102 in the vibrator 103 via the wiring substrate 104. Since the vibrating protrusion portions 101a compressively contact the frictional contact surface 13 of the friction member 113, the driving force is generated in the Z direction and the moving unit moves in the Z direction. The driven member can be moved in the Z direction by coupling the driven member with the moving base member 110.

This embodiment provides the first contact portion (protrusion portion 109a) to the pressure transmitting member 109, and the second contact portion (concave 105) to the vibrator holder 105. However, the pressure transmitting member 109 may have the second contact portion and the vibrator holder 105 may have the first contact portion. In other words, the first contact portion may be provided to one of the pressure transmitting member 109 and the vibrator holder 105, and the second contact portion may be provided to the other of the pressure transmitting member 109 and the vibrator holder 105. Moreover, this embodiment provides a third contact portion (shaft member 109b) to the pressure transmitting member 109 and a fourth contact portion (elongate hole portion 110a-1) to the moving base member 110. However, the pressure transmitting member 109 may have the fourth contact portion, and the moving base member 110 may have the third contact portion. In other words, the third contact portion may be provided to one of the pressure transmitting member 109 and the moving base member 110, and the fourth contact portion may be provided to the other of the pressure transmitting member 109 and the moving base member 110.

While this embodiment discusses the linear type vibration driven actuator, a configuration similar to this embodiment is applicable to the rotation type (ring type) vibration driven actuator.

Second Embodiment

Figure 5:
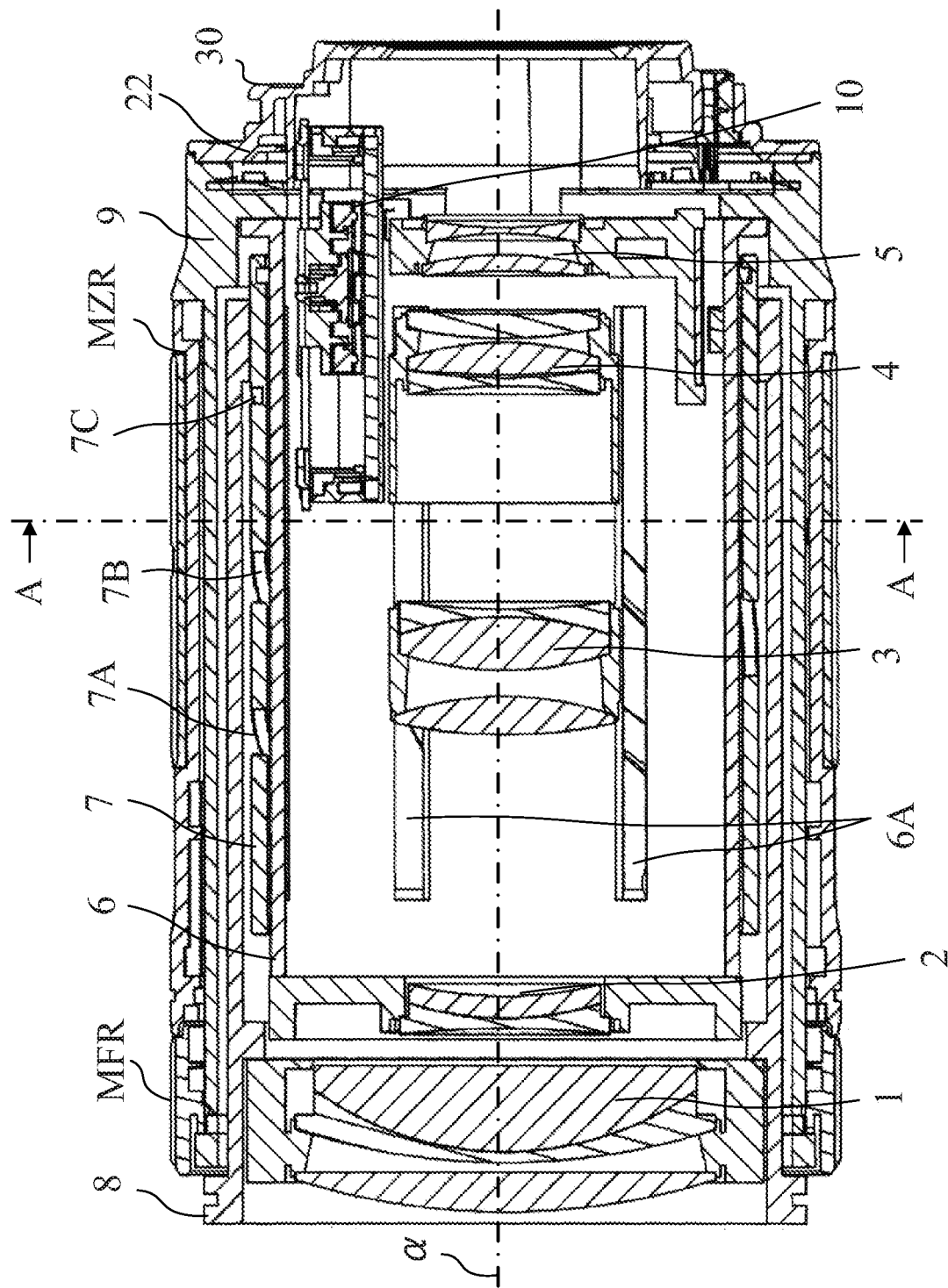
FIG. 5 is a sectional view of an interchangeable lens according to a second embodiment of the present invention.

FIG. 5 illustrates a configuration (on a section along the optical axis α) of a lens barrel provided in an interchangeable lens as an optical apparatus according to a second embodiment of the present invention. The vibration driven actuator described in the first embodiment is installed in this lens barrel.

Reference numeral 1 denotes a first lens unit disposed on a foremost side (object side) and held by a linear cylinder 8. The first lens unit 1 moves with the linear cylinder 8 in an optical axis direction as a direction in which the optical axis α extends when a cam cylinder 7 is rotated in varying a magnification. Reference numeral 2 denotes a second lens unit, which is held by a guide cylinder 6. Reference numeral 3 denotes a third lens unit, which is held by the guide cylinder 6. The third lens unit 3 moves in the optical axis direction when the cam cylinder 7 is rotated in varying a magnification. Reference numeral 4 denotes a fourth lens unit, which is held by the guide cylinder 6. The fourth lens unit 4 moves in the optical axis direction when the cam cylinder 7 is rotated in varying a magnification. Reference numeral 5 denotes a fifth lens unit for focusing when driven in the optical axis direction by a focus actuator 10, which will be described later.

The guide cylinder 6 has linear grooves 6A each of which is engaged with an unillustrated cam follower provided in the third and fourth lens units 3 and 4, and guides the third and fourth lens units 3 and 4 in the optical axis direction. The cam cylinder 7 has cam grooves 7A, 7B, and 7C that are engaged with unillustrated cam followers provided in the third and fourth lens units 3 and 4 and the linear cylinder 8 moves the third and fourth lens units 3 and 4 in the optical axis direction. The linear cylinder 8 is disposed on outer circumferences of the guide cylinder 6 and the cam cylinder 7.

Reference numeral 9 denotes a fixed cylinder, and a mount 30 detachably coupled with an unillustrated camera 200 is fixed onto an end on its back side (image plane side). A manual focus ring MFR and a manual zoom ring MZR are provided on the outer circumference of the fixed cylinder 9 rotatably around the optical axis. When the manual focus ring MFR is rotated, the focus actuator 10 moves the fifth lens unit 5 in the optical axis direction for manual focusing. When the manual zoom ring MZR is rotated, the first, third and fourth lens units 1, 3, and 4 are moved in the optical axis direction for manual zooming.

The focus actuator 10 is a linear type vibration driven actuator (100) described in the first embodiment. Reference numeral 22 denotes a control substrate configured to detect a rotation of the manual focus ring MFR and to control driving of the focus actuator 10 (vibration excited in the vibrator (103)) so as to move the fifth lens unit 5 as the driven member in the optical axis direction. The control substrate 22, an unillustrated sensor configured to detect a rotation of the manual focus ring MFR, and the focus actuator 10 are electrically connected to one another by unillustrated FPC (flexible printed circuits).

This embodiment uses the vibration driven actuator (100) described in the first embodiment as the focus actuator 10, and realizes an interchangeable lens that can highly precisely control a position and movement of the fifth lens unit 5.

While this embodiment describes the lens barrel of the interchangeable lens, the vibration driven actuator described in the first embodiment can be used for the lens barrel used for the lens integrated type image capturing apparatus (optical apparatus).

The vibration driven actuator according to the first embodiment is not limited to the above optical apparatus, and is applicable to a variety of apparatuses having a driven member to be driven by a vibration driven actuator.

Each of the above embodiments can restrain a contact position shift between the pressing member and the pressure transmitting member and a relative position shift between the pressure transmitting member and the vibrator, through a simple structure in which the first and second contact portions provided to the pressure transmitting member and the vibrator holder contact each other. Therefore, each embodiment can provide a small vibration driven actuator having a stable characteristic. Moreover, the present invention can realize an optical apparatus and another apparatus which can highly precisely control a position and movement of a driven member, such as a lens, by using the vibration driven actuator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-154217, filed Aug. 4, 2015 which is hereby incorporated by reference herein in its entirety.

What is claimed is:

1. An actuator comprising:
a vibrator in which a vibration is excited by an application of a voltage;
a holder configured to hold the vibrator;
a friction member configured to contact the vibrator;
a pressing member configured to generate a pressing force in a first direction; and
a transmitting member configured to transmit the pressing force to the vibrator,
wherein a relative position between the vibrator and the friction member in a second direction orthogonal to the first direction changes due to the vibration,
wherein a protrusion portion is provided to one of the holder and the transmitting member and a displacement restrictor opposed to the protrusion portion in the second direction is provided to the other of the holder and the transmitting member,
the protrusion portion and the displacement restrictor restrict a relative displacement between the holder and the transmitting member in the second direction due to contact with each other, and allow a relative rotation between the holder and the transmitting member in a plane parallel to the first direction and the second direction.

2. The actuator according to claim 1, wherein the displacement restrictor has a plane which contacts the protrusion portion.

3. The actuator according to claim 1, further comprising a base member configured to hold the holder so as to allow the holder to displace in the first direction and to rotate in the plane.

4. The actuator according to claim 3, further comprising:
a base member configured to hold the holder,
wherein a contact portion is provided to each of the transmitting member and the base member,
wherein each contact portion restricts a relative displacement between the transmitting member and the base member in a third direction orthogonal to the first direction and the second direction due to contact with each other, and allows a relative rotation between the transmitting member and the base member in the plane.

5. The actuator according to claim 4, wherein one of the contact portions is a shaft portion and the other is a hole portion.

6. The actuator according to claim 5, wherein the shaft portion is provided to the transmitting member and the hole portion is provided to the base member.

7. An apparatus comprising:
the actuator according to claim 1; and
a driven member driven by the actuator.

8. The apparatus according to claim 7, wherein the driven member is a lens.

9. The actuator according to claim 1, wherein the displacement restrictor does not contact the protrusion portion in the first direction.

10. The actuator according to claim 1, further comprising,
a wiring substrate which is electrically connected to a piezoelectric element in the vibrator,
wherein the holder includes a wire leading portion through which the wiring substrate passes, and
wherein the wire leading portion is provided at a position at which the wire leading portion faces the displacement restrictor in a third direction which is orthogonal to the first direction and the second direction.

11. The actuator according to claim 1, wherein the displacement restrictor does not contact the protrusion portion in a third direction which is orthogonal to the first direction and the second direction.

12. The actuator according to claim 1, wherein the protrusion portion has a curved surface which contacts the displacement restrictor.

13. The actuator according to claim 12, wherein the curved surface linearly contacts the displacement restrictor.

14. The actuator according to claim 1, wherein the protrusion portion is provided to the transmitting member and the displacement restrictor is provided to the holder.

* * * * *